US010007314B2

(12) United States Patent
Flynn et al.

(10) Patent No.: US 10,007,314 B2
(45) Date of Patent: Jun. 26, 2018

(54) POWER SIGNAL INTERFACE

(71) Applicant: ARM LIMITED, Cambridge, Cambridgeshire (GB)

(72) Inventors: David Walter Flynn, Cambridge (GB); James Edward Myers, Bottisham (GB)

(73) Assignee: ARM Limited, Cambridge (GB)

(*) Notice: Subject to any disclaimer, the term of this patent is extended or adjusted under 35 U.S.C. 154(b) by 0 days. days.

(21) Appl. No.: 14/907,945

(22) PCT Filed: Jun. 16, 2014

(86) PCT No.: PCT/GB2014/051846
§ 371 (c)(1),
(2) Date: Jan. 27, 2016

(87) PCT Pub. No.: WO2015/025124
PCT Pub. Date: Feb. 26, 2015

(65) Prior Publication Data
US 2016/0170465 A1 Jun. 16, 2016

(30) Foreign Application Priority Data

Aug. 21, 2013 (GB) .................................. 1314939.8
Sep. 2, 2013 (GB) .................................. 1315582.5

(51) Int. Cl.
G06F 1/32 (2006.01)
G06F 1/26 (2006.01)
(Continued)

(52) U.S. Cl.
CPC ............ *G06F 1/3203* (2013.01); *G06F 1/324* (2013.01); *G06F 1/3234* (2013.01);
(Continued)

(58) Field of Classification Search
None
See application file for complete search history.

(56) References Cited

U.S. PATENT DOCUMENTS 6,983,389 B1    1/2006  Filippo
9,235,252 B2 *  1/2016  Shrall .................. G06F 1/3206
(Continued)

FOREIGN PATENT DOCUMENTS

CN    101493717    7/2009
CN    102545272    7/2012
(Continued)

OTHER PUBLICATIONS

International Search Report for PCT/GB2014/051846, dated Aug. 11, 2014, 4 pages.
(Continued)

Primary Examiner — Ji H Bae
(74) Attorney, Agent, or Firm — Nixon & Vanderhye P.C.

(57) ABSTRACT

Mechanisms are provided for energy management signalling with an apparatus for processing data, such as a system-on-chip integrated circuit (2). Processing circuitry (6, 8, 10) is coupled to consumer energy interface circuitry (14, 16, 18) which communicates with energy management circuitry (4). The energy management signals which are communicated include a static power consumption signal indicative of a level of power consumption which is independent of processing operations being performed and a dynamic power consumption signal indicative of a level of dynamic power consumption which is dependent upon the processing operations being performed.

13 Claims, 5 Drawing Sheets

Figure 1:
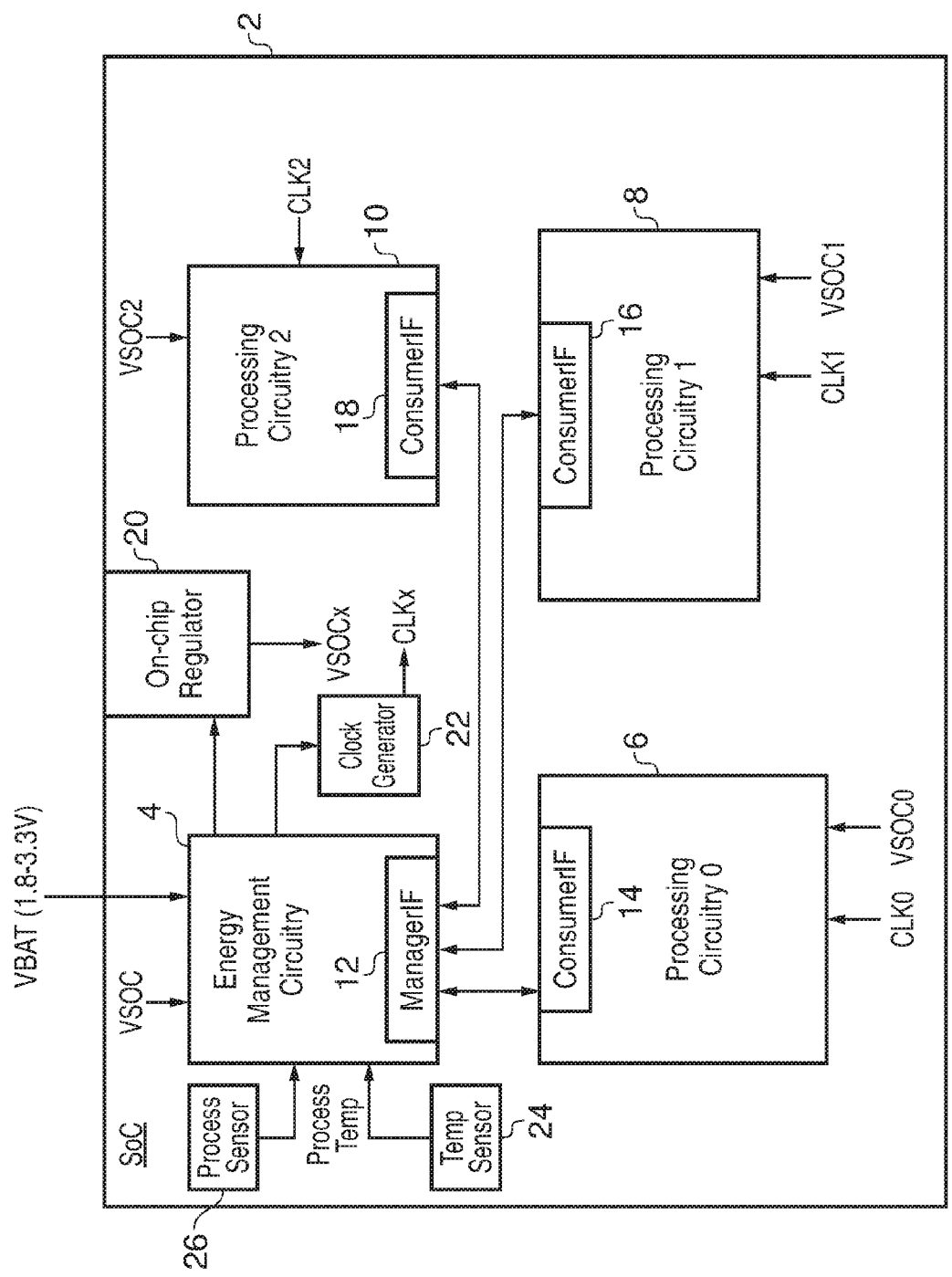

(51) Int. Cl.
*G06F 11/30* (2006.01)
*G06F 13/00* (2006.01)

(52) U.S. Cl.
CPC ........ *G06F 1/3296* (2013.01); *G06F 11/3024* (2013.01); *G06F 11/3096* (2013.01); *G06F 1/26* (2013.01); *G06F 1/3206* (2013.01); *G06F 11/30* (2013.01); *G06F 11/3058* (2013.01); *G06F 13/00* (2013.01); *Y02B 60/1217* (2013.01); *Y02B 60/1285* (2013.01)

(56) References Cited

U.S. PATENT DOCUMENTS

| | | |
|---|---|---|
| 2003/0025689 A1 | 2/2003 | Kim |
| 2003/0212916 A1 | 11/2003 | Ito et al. |
| 2008/0069558 A1 | 3/2008 | Deogun et al. |
| 2008/0203993 A1 | 8/2008 | Lee |
| 2008/0229127 A1* | 9/2008 | Felter .................... G06F 1/3203 713/320 |
| 2008/0263373 A1* | 10/2008 | Meier .................... G06F 9/3017 713/300 |
| 2008/0270105 A1 | 10/2008 | Poplack et al. |
| 2008/0307240 A1 | 12/2008 | Dahan et al. |
| 2008/0313480 A1 | 12/2008 | Malhi et al. |
| 2008/0320323 A1 | 12/2008 | Brittain et al. |
| 2009/0150695 A1* | 6/2009 | Song .................... G06F 1/3203 713/323 |
| 2011/0131427 A1 | 6/2011 | Jorgenson et al. |
| 2011/0291746 A1* | 12/2011 | Ibrahim ................ G06F 1/3206 327/538 |
| 2012/0017104 A1* | 1/2012 | Siba ...................... G06F 1/3203 713/323 |
| 2012/0030486 A1* | 2/2012 | Pop ........................ G01D 21/00 713/320 |
| 2012/0072743 A1* | 3/2012 | Lee ........................ G06F 1/3287 713/300 |
| 2012/0079290 A1* | 3/2012 | Kumar .................... G06F 1/26 713/300 |
| 2012/0102344 A1 | 4/2012 | Kocev et al. |
| 2012/0109550 A1 | 5/2012 | Naffziger et al. |
| 2012/0290865 A1 | 11/2012 | Kansal et al. |
| 2013/0138977 A1 | 5/2013 | Herman et al. |
| 2013/0145180 A1 | 6/2013 | Branover et al. |
| 2014/0237272 A1* | 8/2014 | Sadowski ............. G06F 1/3275 713/320 |

FOREIGN PATENT DOCUMENTS

| | | |
|---|---|---|
| EP | 1 677 175 | 7/2006 |
| TW | 200640157 | 11/2006 |
| WO | WO 2013/008934 | 1/2013 |

OTHER PUBLICATIONS

Written Opinion of the ISA for PCT/GB2014/051846, dated Aug. 11, 2014, 9 pages.
Search Report for GB 1315582.5, dated Jan. 30, 2014, 3 pages.
Taiwanese Office Action and Search Report dated Sep. 28, 2017 in TW Application 103127293 and English translation, 21 pages.
English translation of Chinese First Office Action dated Apr. 2, 2018 in CN Application No. 201480045134.3, 9 pages.

* cited by examiner

POWER SIGNAL INTERFACE

This application is the U.S. national phase of International Application No. PCT/GB2014/051846 filed 16 Jun. 2014, which designated the U.S. and claims priority to GB Patent Application Nos. 1314939.8 filed 21 Aug. 2013, and 1315582.5 filed 2 Sep. 2013, the entire contents of each of which are hereby incorporated by reference.

This invention relates to the field of data processing systems. More particularly, this invention relates to the signalling of power parameters between components within an apparatus for processing data.

It is known to provide system-on-chip integrated circuits containing multiple functional blocks. These functional blocks may, for example, include a general purpose processor, a wireless communication block, a memory, a signal processing unit, etc. It is also known that such integrated circuits are often required to operate within strict power constraints. For example, the peak power which may be consumed may be limited in order that the operating voltage does not fall too low. There may also be limitations on the average power that may be consumed over a period so as to "break even" with respect to energy being sourced, for example, from energy harvesting or to ensure an acceptable battery life. The requirements for energy management are further complicated as it is known practice to place different functional blocks within different operating states so as to save power. For example, some functional blocks may be placed into a static power saving mode when they are not in use, while other functional blocks remain heavily used and consuming relatively large amounts of power. The many different operational circumstances that can arise are difficult to model (anticipate) in advance and the system-on-chip integrated circuit should be able to respond to its current state in managing its power consumption.

Viewed from one aspect the present invention provides apparatus for processing data comprising:

processing circuitry configured to perform processing operations; and consumer energy interface circuitry coupled to said processing circuitry and configured to communicate energy management signals with energy management circuitry;

wherein said energy management signals include:

(i) a static power consumption signal indicative of a level of static power consumption of said apparatus independent of processing operations performed by said processing circuitry; and (ii) a dynamic power consumption signal indicative of a level of dynamic power consumption of said apparatus dependent upon processing operations performed by said apparatus.

The present invention recognises that the accuracy and efficiency of power control may be improved when processing circuitry which consumes energy is provided with a consumer energy interface for communicating energy management signals with energy management circuitry where those energy management signals include both a static power consumption signal and a dynamic power consumption signal. The static power consumption signal can provide the energy management circuitry an indication of the level of static power consumption of the processing circuitry concerned that is independent of the processing operations being performed by the processing circuitry (e.g. the static power signal may be indicative of the power consumed due to leakage currents within the processing circuitry). The static power consumption signal may be changed to reflect a current static mode, e.g. clock stopped vs. power gated.

The dynamic power consumption signal is indicative of a level of dynamic power consumption that is dependent upon the processing operations performed by the processing circuitry. This dynamic power consumption may vary in dependence upon the nature of the processing operations currently being performed and this information can be used to change the dynamic power consumption signal, (e.g. activity may be characterised by a cache hit/miss rate, load/store versus arithmetic instruction rate, a percentage of clock gates enabled etc). The energy management circuitry may use these two different power consumption signals to more accurately and efficiently manage the energy distribution and consumption within the apparatus as a whole.

In some embodiments the static power consumption signal can vary in accordance with a selected one of a plurality of modes which can be adopted when the apparatus is not performing processing operations. These modes can include at least one of a standby mode in which the signals of the apparatus remain in situ such that the apparatus is able to resume processing without having to reinstate state signals (e.g. a clock is stopped within a static processor), a state retention mode in which state signals of the apparatus are saved to state retention circuitry (e.g. balloon latches) within the apparatus such that the apparatus is able to resume processing by restoring the state signals from the state retention circuitry, and a power-down mode in which the state signals of the apparatus are no longer stored within the apparatus and the power supply to the apparatus is gated off. These different modes of static behaviour will have different levels of power consumption associated therewith and this can be reflected in the static power consumption signal which is returned to the energy management circuitry. It may be that depending upon the state of the rest of the apparatus a different one of these static modes is preferred when balancing the energy consumed against the latency associated with restarting processing when exiting the static mode.

It will be appreciated that static power consumption, such as leakage, typically has a strong dependence upon temperature. However, the system can be advantageously simplified when the static power consumption signal is made independent of the operating temperature. The energy management circuitry can obtain an operating temperature for the apparatus as a whole and perform any necessary correction without requiring the generation of the static consumption power signal to take this factor into account before it is generated and sent to the energy management circuitry. Temperature within energy constrained integrated circuits is typically uniform across the integrated circuit and accordingly a centralised measurement of temperature is more efficient rather than requiring each sender of power consumption signal data to separately measure its own temperature.

The dynamic power consumption signal is indicative of a prediction of a power consumed by the processing operations within the processing circuitry. In practice, the actual amount of power consumed may vary depending upon temperature, operating voltage, clock frequency and manufacturing process variations. However, as mentioned above, it is more efficient to correct for such chip-wide effects centrally rather than requiring each sender of a dynamic power consumption signal to separately measure and correct for these parameters.

In contrast to correction for chip-wide parameters as mentioned above, in some embodiments the dynamic power consumption signal may be varied in dependence upon a level of detected processing activity within the apparatus. The power consumed by the processing circuitry performing processing operations may vary considerably based on the nature of those processing operations. The processing circuitry may be instrumented to obtain an indication(s) of the type of activity that it is currently performing and use this information to modify the dynamic power consumption signal which is sent so that it is more accurate in representing the dynamic power consumption associated with those processing operations. As an example, if the processing operations are merely a NOP loop, then relatively little power may be consumed compared with processing operations which are performing a dense stream of arithmetically complex processing operations and a high rate of load/store operations.

The dynamic power consumption signal may also be varied in dependence upon a mode of operations performed by the apparatus. Such a mode may be relatively coarsely determined and yet provide an improved level of accuracy in the dynamic power signal. For example, in the case of circuitry performing wireless communication, there may be a considerable difference between the power consumed when receiving a signal compared to when transmitting a signal and accordingly a receive/transmit mode indication can be used to increase the accuracy of the dynamic power consumption signal.

The static power consumption signal and the dynamic power consumption signal are sent from the consumer to the energy management circuitry. The energy management signals which are communicated may also include an allocation signal sent from the energy management circuitry to the apparatus including the processing circuitry and indicative of a power level allocated to that apparatus. The system as a whole may be operating within a constrained power budget and the energy management circuitry may control the allocation of that power budget between different elements of the system as a whole. Accordingly, the allocation signal may be provided to the apparatus including the processing circuitry and used to control an operating mode of that apparatus, e.g. a clock frequency for the processing circuitry performing the processing operations may be throttled in dependence upon the allocation signal received so as to stay within a power budget which has been allocated to those processing operations.

It is desirable that the energy management signals should be able to reliably represent power levels extending over a wide possible range. Accordingly, in some embodiments the energy management signals use a logarithmically encoded power level and furthermore use thermometer encoding of power level (e.g. in combination with the logarithmic encoding). Different encoding types could be used for the dynamic and static power consumption signals in some embodiments. The logarithmic approach has an overhead associated with the need to form linear sub-terms that are then summed prior to log conversion and the log term may then need to be converted back to linear form before use by the energy manager.

In order to simplify design use and between different processing circuitry that is possibly provided by different organisations, in preferred embodiments the static power consumption signal and the dynamic power consumption signal attempt to represent an absolute level of power consumption of the apparatus (this absolute level may require correction for effects such as temperature, operating voltage, process variation etc. as discussed above, but at least at a gross level attempts to represent absolute power consumption rather than a more abstract fraction of or other representation of power consumed).

As different portions of the system may be in different modes of operation and different power states at different times, the communication of the energy management signals may be simplified and made more robust if it uses asynchronous request-acknowledge handshaking between said consumer energy interface and the energy management circuitry.

Viewed from another aspect the present invention provides apparatus for processing data comprising:
processing means for performing processing operations; and
consumer energy interface means for communicating energy management signals with energy management means for managing energy;
wherein said energy management signals include:
(i) a static power consumption signal indicative of a level of static power consumption of said apparatus independent of processing operations performed by said processing means; and
(ii) a dynamic power consumption signal indicative of a level of dynamic power consumption of said apparatus dependent upon processing operations performed by said processing means.

Viewed from a complementary aspect the present invention provides energy management circuitry for managing power consumption of at least one apparatus for processing data, said energy management circuitry comprising:
manager energy interface circuitry configured to communicate energy management signals with said at least one apparatus for processing data;
wherein said energy management signals include:
(i) a static power consumption signal indicative of a level of static power consumption of said apparatus independent of processing operations performed by processing circuitry within said apparatus; and
(ii) a dynamic power consumption signal indicative of a level of dynamic power consumption of said apparatus dependent upon processing operations performed by said processing circuitry.

The energy management circuit for managing power consumed will typically, but not essentially, be formed on the same integrated circuit as the apparatus for processing data. This energy management circuitry includes manager energy interface circuitry that communicates the energy management signals as previously discussed.

The energy management circuitry may advantageously include energy controller circuitry that is configured to compensate/correct for various chip-wide effects as previously discussed. Accordingly, both of the static power consumption and the dynamic power consumption may be corrected for variables including an operating temperature, an operating voltage and manufacturing process variation (for example as detected by an on-chip process characterisation block). Furthermore, the dynamic power consumption may also be corrected to take into account the current operating frequency of the processing circuitry associated with the dynamic power signal concerned.

In order to facilitate the above corrections, the energy controller circuitry may store data indicative of one or more of a rate at which the static and/or dynamic power consumption vary with temperature and/or operating voltage. These rates may be different for static and dynamic operation, may vary from chip-to-chip, and accordingly can be measured and stored within programmable storage accessible to the energy controller circuitry.

The energy controller circuitry may be configured to use the energy management signals to change one or more of the operating parameters of the apparatus including the processing circuitry which has provided those energy management signals. The energy controller circuitry may, for example, control a frequency of an operating clock signal, an operating voltage used during processing operations and/or an operating voltage supplied when the processing circuitry is not performing processing operations (e.g. a standby voltage).

In order that the energy management circuitry itself should not consume too much power it is in some embodiments provided in the form of an energy management state machine.

The energy management circuitry may include energy supply circuitry configured to supply energy to the apparatus for processing data and to provide the energy management circuitry with a signal indicative of how much power is being currently provided. For example, the energy supply circuitry may be associated with energy harvesting and provide an indication of how much power is currently being harvested and/or may be associated with a charge storage device (such as a battery or a super-capacitor) and provide a signal indicative of the current charge state of that battery. Another option would be that the energy supply circuitry is associated with a source of mains power supply and accordingly indicate to the energy management circuitry that the apparatus is currently mains powered and energy conservation is likely less important than performance.

Viewed from a further aspect the present invention provides energy management circuitry for managing power consumption of at least one apparatus for processing data, said energy management circuitry comprising:

manager energy interface means for communicating energy management signals with said at least one apparatus for processing data;

wherein said energy management signals include:
(i) a static power consumption signal indicative of a level of static power consumption of said apparatus independent of processing operations performed by processing circuitry within said apparatus; and
(ii) a dynamic power consumption signal indicative of a level of dynamic power consumption of said apparatus dependent upon processing operations performed by said processing circuitry.

Viewed from a further aspect the present invention provides a method of processing data comprising the steps of:
performing processing operations with processing circuitry; and
communicating energy management signals with energy management circuitry;
wherein said energy management signals include:
(i) a static power consumption signal indicative of a level of static power consumption of said apparatus independent of processing operations performed by said processing circuitry; and
(ii) a dynamic power consumption signal indicative of a level of dynamic power consumption of said apparatus dependent upon processing operations performed by said processing circuitry.

Viewed from a further aspect the present invention provides a method of managing power consumption of at least one apparatus for processing data, said method comprising the step of:
communicating energy management signals with said at least one apparatus for processing data;
wherein said energy management signals include:
(i) a static power consumption signal indicative of a level of static power consumption of said apparatus independent of processing operations performed by processing circuitry within said apparatus; and
(ii) a dynamic power consumption signal indicative of a level of dynamic power consumption of said apparatus dependent upon processing operations performed by said processing circuitry.

Figure 2:
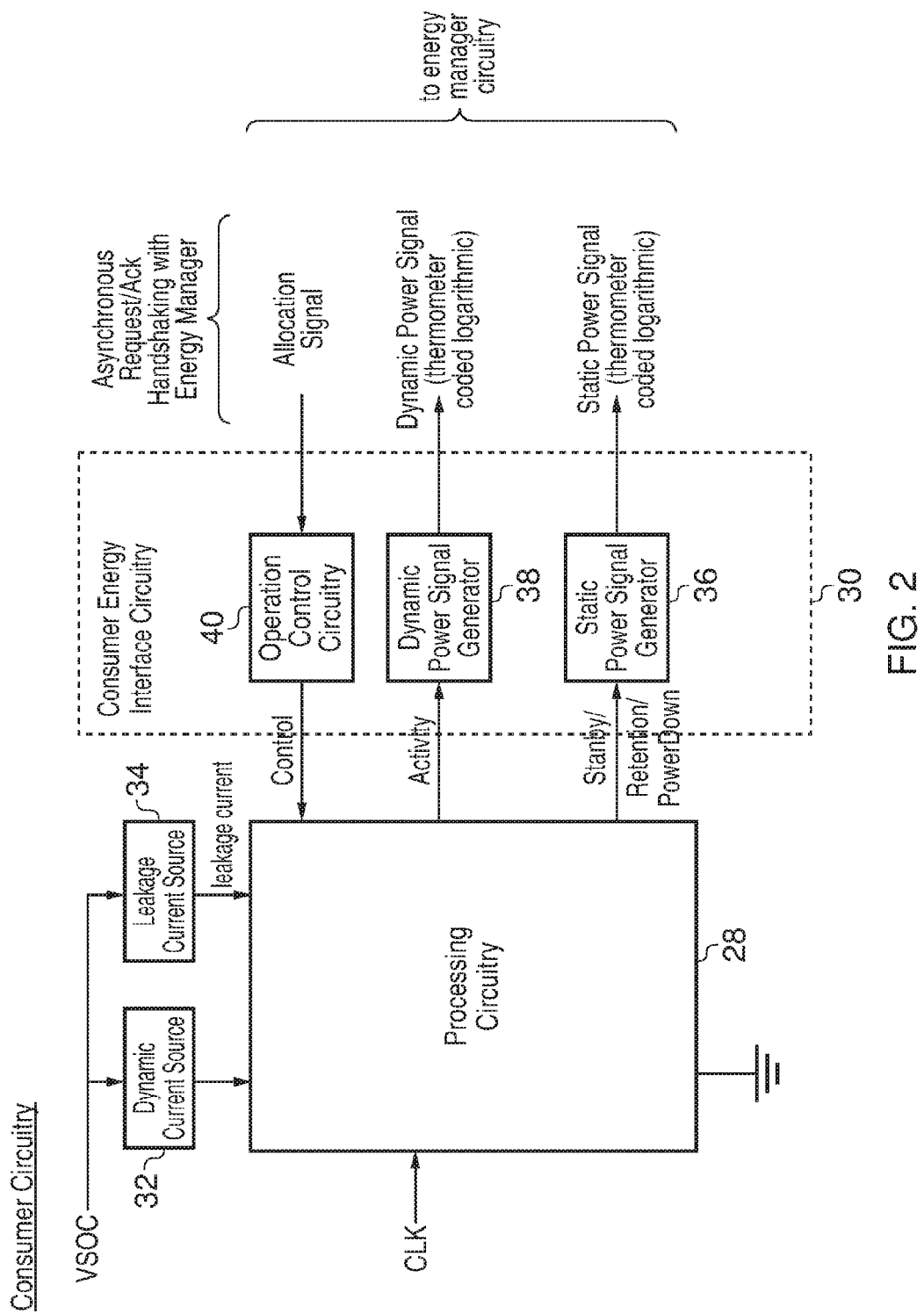
Figure 3:
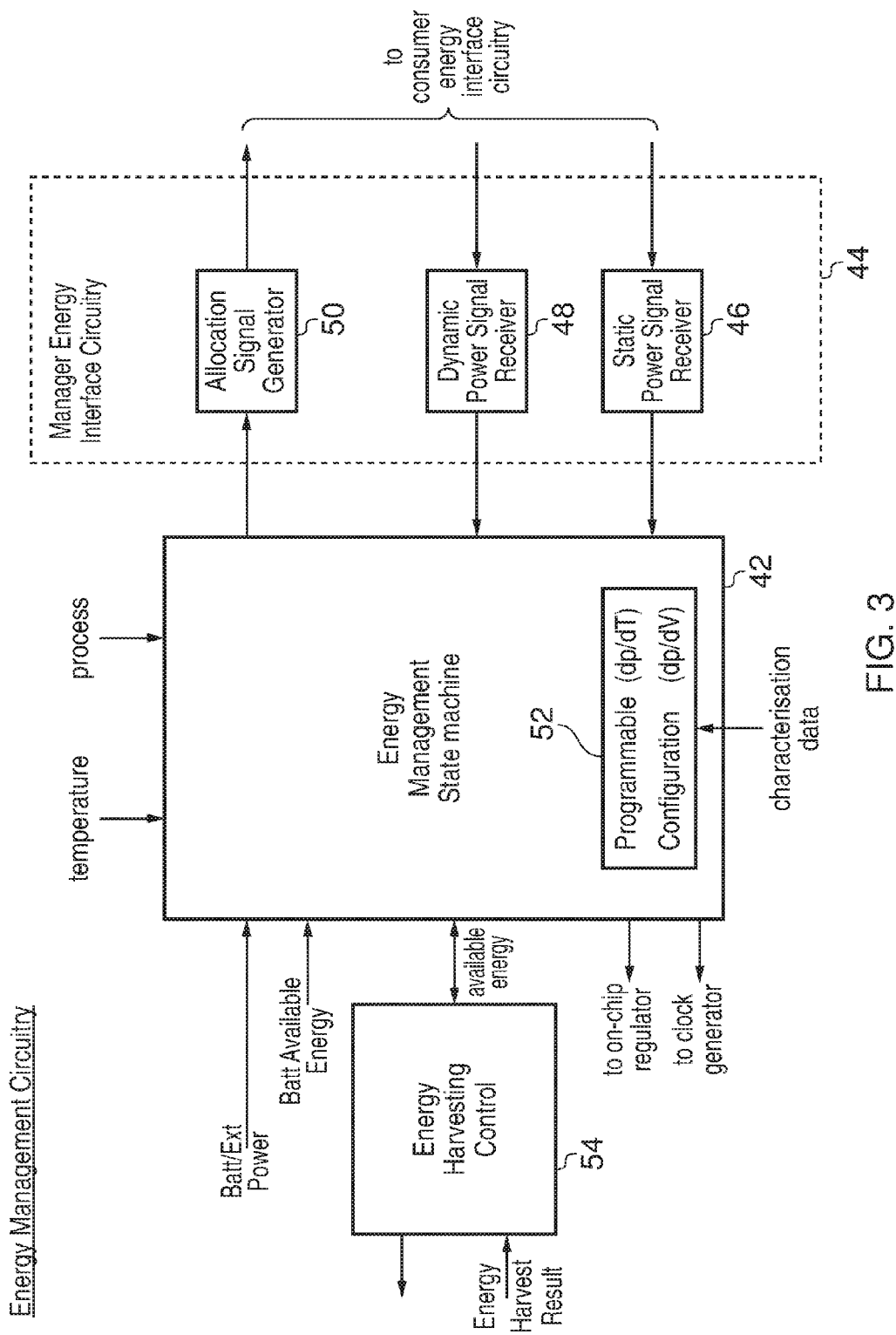
Figure 4:
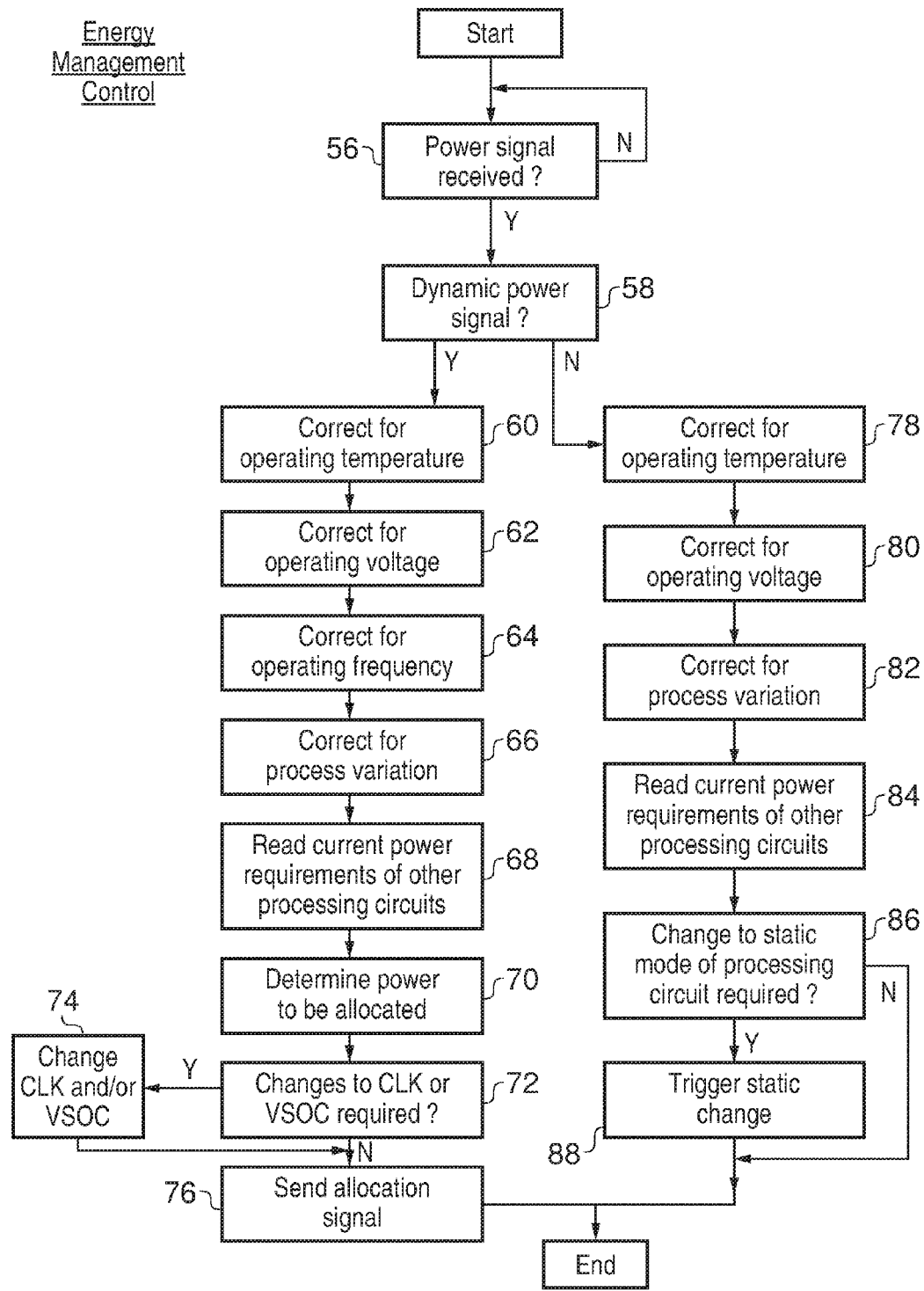
Figure 5:
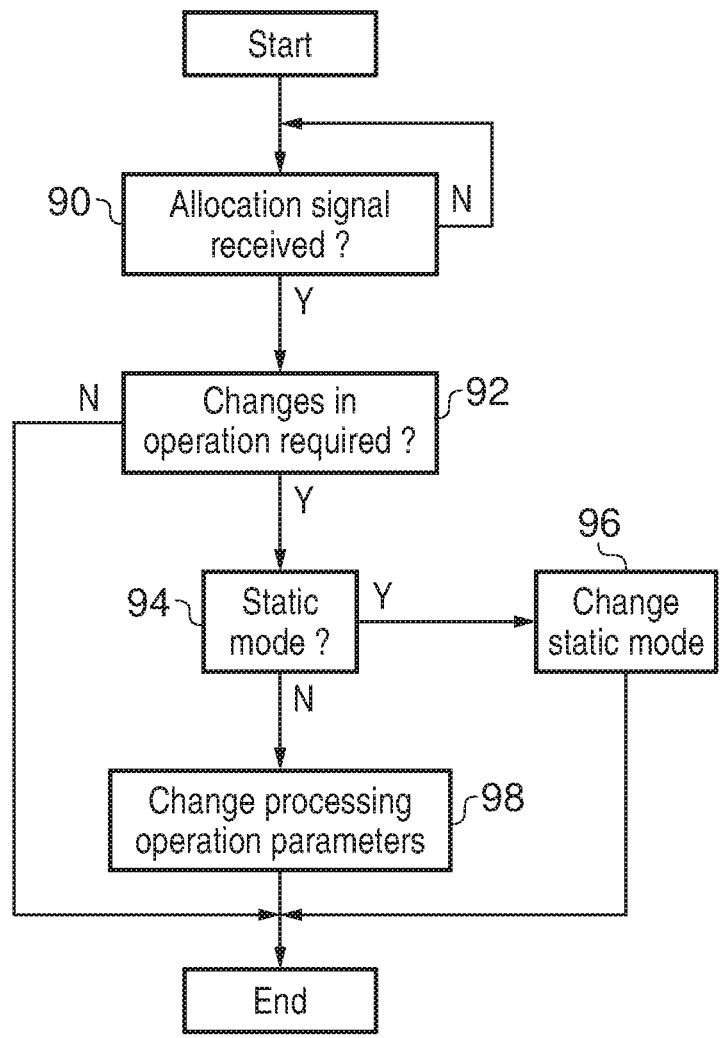

Embodiments of the invention will now be described, by way of example only, with reference to the accompanying drawings in which:

FIG. 1 schematically illustrates a system-on-chip integrated circuit including mechanisms for exchanging energy management signals;

FIG. 2 schematically illustrates circuitry that consumes energy and includes interface circuitry for communicating with energy management circuitry;

FIG. 3 schematically illustrates energy management circuitry including interface circuitry for communicating with consumer circuitry;

FIG. 4 schematically illustrates an energy management control as performed by the energy management circuitry; and FIG. 5 is a flow diagram schematically illustrating the response of processing circuitry to a received allocation signal from the energy management circuitry.

FIG. 1 schematically illustrates a system-on-chip integrated circuit 2 including energy management circuitry 4 and a plurality of instances of processing circuitry 6, 8, 10 which all consume energy as management by the energy management circuitry 4. The energy management circuitry 4 includes manager energy interface circuitry 12, which communicates energy management signals with respective consumer energy interface circuitry 14, 16, 18 associated with the different instances of processing circuitry 6, 8, 10.

Each of the instances of the processing circuitry 6, 8, 10 is supplied with its own operating voltage VSOC0, VSOC, VSOC2 which is generated by an on-chip regulator 20 operating under control of the energy management circuitry 4. Each of the instances of the processing circuitry 6, 8, 10 also receives a respective clock signal CLK0, CLK1, CLK2 which is generated by a clock generator 22, which also operates under control of the energy management circuitry 4. The energy management circuitry 4 may independently vary the operating voltage and clock frequency supplied to the different instances of processing circuitry 6, 8, 10.

The energy management circuitry is coupled to a temperature sensor 24 and a process sensor 26 which respectively provide a temperature indicating signal and a manufacturing process variation indicating signal to the energy management circuitry 4. System-on-chip integrated circuits typically have a uniform temperature when operating in a low power environment and accordingly the temperature sensor 24 can provide a temperature signal which provides an acceptable indication of the operating temperature of each of the different instances of the processing circuitry 6, 8, 10. Thus, the energy management circuitry 4 temperature compensates the power consumption signals it receives from these different current sources in dependence upon a centrally measured temperature. In a similar way, the process sensor 26 can generate a signal indicating manufacturing process variation whereby different individual integrated circuits will have different power consumption characteristics depending upon the individual chip-to-chip or wafer-to-wafer variation in manufacture that can arise. Characterising circuits, such as the process sensor 26, may be provided to give an indication of the individual process variation of a particular integrated circuit and provide this indication to the energy management circuitry 4 so that it may compensate the power consumption signals it receives to take account of this process variation. Process variation typically does not vary within a given integrated circuit and thus may be compensated for on a chip-wide basis.

FIG. 2 schematically illustrates an instance of processing circuitry 28 and its associated consumer energy interface circuitry 30. The processing circuitry 28 receives an operating clock signal CLK with a clock frequency which is controlled by the energy management circuitry 4. An operating voltage VSOC is supplied to the processing circuitry 10 and may (at least conceptually) be considered to supply energy to both a dynamic current source 32 and a static current source 34. The dynamic current source 32 provides the dynamic current necessary for the processing circuitry to perform processing operations and the leakage current source 34 provides the leakage current associated with the processing circuitry 28 (e.g. when it is in a static mode, such as a stopped clock mode, a data retention mode or a power gated mode, although there is also a leakage current when processing is performed as the circuits are clocked).

The consumer energy interface circuitry 30 includes a static power consumption signal generator 36, a dynamic power consumption signal generator 38 and operating control circuitry 40. The static power consumption signal generator 36 receives a signal from the processing circuitry 28 indicating a current static mode of operation of the processing circuitry 28. The static modes may include a standby mode in which state signals remain in situ within the processing circuitry but the clock is stopped, a retention mode in which the state signals are saved to retention circuitry (such as balloon latches) so that they can be restored and processing resumed, and a power down state in which the processing circuitry is power gated and state signals are no longer retained within the processing circuitry 28. Other forms of static mode will be familiar to those in this technical field. The static power consumption signal generator 36 uses these received mode signals to generate a corresponding static power consumption signal which is supplied to the energy management circuitry 4. This static power consumption signal is a thermometer coded logarithmic signal attempting to give an absolute value of the power being consumed associated with the current static behaviour. It will be appreciated that this static behaviour includes the power consumed due to leakage. Leakage will occur when the processing circuitry is both performing processing operations and when it is not performing processing operations. The static power consumption signal is accordingly independent of whether processing operations are being performed by the processing circuitry and may be added to a dynamic power signal to obtain a measure of the total power consumed when the processing circuitry 28 is performing processing operations.

The dynamic power consumption signal generator 38 receives a signal from the processing circuitry 28 indicative of the current processing activity being performed by the processing circuitry 28. This activity signal could, for example, indicate a rate of cache misses/hits, a rate of load/store and/or arithmetic operations, whether the processing circuitry is in a receive-only, a transmit-only or a receive and transmit mode, etc. The dynamic power consumption signal generator 38 uses this activity signal to produce appropriate dynamic power consumption signal which is again thermometer coded and provides a logarithmic representation of an estimated absolute dynamic power consumption which is dependent upon the processing operations currently being performed by the processing circuitry 28. This dynamic power consumption signal may be added to the static power consumption signal by the energy management circuitry to provide a measure of the total power consumed by the processing circuitry 28 at a given point in time.

The operation control circuitry 40 receives an allocation signal from the energy management circuitry 4 and uses this to produce a control signal which is supplied to the processing circuitry 28. This control signal may, for example, impose limitations upon the operation of the processing circuitry 28 such that it may stay within an allocated power budget. This power budget may be associated with a peak power constraint, an average power consumption constraint or some other power consumption constraint. Examples of the control which may be exercised over the processing circuitry 28 is that it may throttle its behaviour, such as a screen refresh rate, a wireless signal polling rate etc.

In order to simplify and make more robust communication between the energy management circuitry 4 and the consumer energy interface circuitry 30, the energy management signals may be communicated using asynchronous request/acknowledge handshaking methods, protocols. Such methods are useful given that the energy management circuitry 4 may typically be operating in a different voltage domain (see FIG. 1) and be asynchronous with different instances of the processing circuitry 6, 8, 10 which may, for example, be power gated at a particular point in time and have their clock stopped.

FIG. 3 schematically illustrates energy management circuitry in the form of energy management state machine 42 and manager energy interface circuitry 44. The manager energy interface circuitry 44 includes a static power consumption signal receiver 46, a dynamic power consumption signal receiver 48 and an allocation signal generator 50. These elements respectively receive and generate the static power consumption signal, the dynamic power consumption signal and the allocation signal as previously discussed. The energy management state machine 42 receives a temperature input from the temperature sensor 24 and a process input from the process sensor 26. The energy management state machine 42 can use these inputs together with information representing the current operating voltage and clock frequency of different instances of the processing circuitry 6, 8, 10 to correct the static power consumption signal and the dynamic power consumption signal received from respective instances of the processing circuitry 6, 8, 10. In particular, the dynamic power consumption signal may be compensated for temperature, process, operating voltage and clock frequency. The static power consumption signal may be compensated for temperature, process and operating voltage. Characterisation data for the individual integrated circuit, or the individual design of integrated circuit is stored within a memory 52 and represents the rate of change of power consumed with temperature (dP/dT), the rate of change of power consumed with voltage (dP/dV) and possibly further correction parameters as desired.

The energy management state machine 42 controls the allocation signal generator to generate an allocation signal which is sent to the instance of the processing circuitry 6, 8, 10 concerned so as to control their operation/mode as previously discussed. The energy management state machine 42 further controls the on-chip regulator 20 and the clock generator 22 to supply an operating voltage(s) (both for dynamic mode and static mode) to the processing circuitry as well as the clock frequency (e.g. fast, slow, stopped) to the instance of the processing circuitry 6, 8, 10 concerned.

Also associated with the energy management circuitry of FIG. 3 is energy supply circuitry, which in this example comprises energy harvesting control circuitry 54. In an embodiment utilising energy harvesting, an indication of the amount of energy harvested is received by the energy harvesting control circuitry 54 and passed to the energy management state machine 42 as an indication of available energy. The energy management state machine 42 can use this information to effectively set the power budget for the integrated circuit 2 and accordingly generate appropriate allocation signals with the allocation signal generator 50. Other signals received by the energy management state machine 42 indicative of the behaviour of the energy supply circuitry 54 include a signal indicating whether the integrated circuit is currently operating with either charge storage device power (e.g. batter or super-capacitor) or external mains power, and if it is operating with charge storage device power, then what is the available energy within that charge storage device. These signals may again be used by the energy management state machine 42 to set an appropriate power budget and generate an appropriate allocation signal as well as to control the operating voltage, the clock frequency, the operating mode etc of different portions of the integrated circuit.

FIG. 4 is a flow diagram schematically illustrating energy management control as performed by the energy management state machine 42. At step 56 processing waits until a power consumption signal is received. Step 58 determines whether or not the power signal is a dynamic power signal. If the power consumption signal is a dynamic power consumption signal, then step 60 corrects for operating temperature variation. Step 62 corrects for the operating voltage of the processing circuitry concerned and step 64 corrects for the operating frequency of the processing circuitry concerned. Step 66 corrects for process variation which is a chip-wide parameter. Step 68 then reads the current power requirements of the other processing circuitry within the integrated circuit and step 70 determines the power to be allocated to the processing circuitry which sent the power consumption signal as well as the other processing circuitry which may be impacted by a change of power consumption that has been signalled. Step 72 determines whether any changes to the clock frequency or the operating voltage (or mode etc) for any of the processing circuitry managed by the energy management state machine 42 are required. If such changes are required, then these are made at step 74. If no changes are required, then step 74 is bypassed. Step 76 sends a power allocation signal(s) back to the processing circuitry which originated the dynamic power consumption signal that was received as well as to any other processing circuitry which has had its power allocation changed.

If the signal received was determined at step 58 not to be a dynamic power consumption signal, then it is a static power consumption signal. Step 78 corrects the static power consumption signal for the current operating temperature. Step 80 corrects for the current operating voltage (different voltage levels may be associated with different static states, such as clock stopped, retention, power gated etc). Step 82 performs a correction of the static power consumption signal in dependence upon the process variation for the integrated circuit concerned. Step 84 then reads the power requirements for the other processing circuits which are currently in place and step 86 determines whether any changes to the static mode of the processing circuitry which sent the static power consumption signal are required. If such changes are required, then these are triggered at step 88. If no changes are required, then step 88 may be bypassed. A change in the static mode as triggered at step 88 may also have consequence to the operation of other processing circuitry within the integrated circuit and these changes can be signalled to those other instances of processing circuitry as required. A change in static behaviour in one processing circuit instance may require changes in static or dynamic behaviour elsewhere. Similarly, a change in dynamic behaviour may require other changes in static or dynamic behaviour elsewhere.

FIG. 5 is a flow diagram schematically illustrating how an instance of processing circuitry responds to a received allocation signal. At step 90 processing waits until an allocation signal is received. Step 92 then determines whether or not any changes in operation are required. If changes are required, then step 94 determines whether or not the processing circuitry is currently in the static mode. If the processing circuitry is currently in the static mode, then step 96 makes an appropriate change to the static node (e.g. switching between clock stopped, state retention and power gated modes). If the determination at step 94 is that the processing circuitry is not in a static mode, then processing proceeds to step 98 where the appropriate change in the dynamic processing operation parameters of the processing circuitry is performed to meet the power budget indicated by the allocation signal received at step 90. This change in operational parameters may be, for example, changing a refresh period or a wireless polling period as previously mentioned.

We claim:

1. Apparatus for processing data comprising:
   processing circuitry configured to perform processing operations; and
   consumer energy interface circuitry coupled to said processing circuitry and configured to communicate energy management signals with energy management circuitry;
   wherein said energy management signals include:
   (i) a static power consumption signal indicative of a level of static power consumption of said apparatus independent of processing operations performed by said processing circuitry, said static power consumption signal being independent of an operating temperature of said apparatus; and
   (ii) a dynamic power consumption signal indicative of a level of dynamic power consumption of said apparatus dependent upon processing operations performed by said apparatus.

2. Apparatus as claimed in claim 1, wherein said static power consumption signal is indicative of power consumed at least partially due to leakage currents within said processing circuitry.

3. Apparatus as claimed in claim 1, wherein said static power consumption signal varies in accordance with a selected one of a plurality of modes of said apparatus when not performing processing operations, said plurality of modes including at least one of:
   (i) a standby mode in which state signals of said apparatus remain in situ such that said apparatus is able to resume processing without having to reinstate said state signals;
   (ii) a state retention mode in which state signals of said apparatus are saved to state retention circuitry within said apparatus such that said apparatus is able to resume processing by restoring said state signals from said state retention circuitry; and (iii) a power-down mode in which state signals of said apparatus are no longer stored within said apparatus and a power supply to said apparatus is gated off.

4. Apparatus as claimed in claim 1, wherein said dynamic power consumption signal is indicative of a prediction of power consumed by said processing operations.

5. Apparatus as claimed in claim 4, wherein said dynamic power consumption signal varies in dependence upon a level of detected processing activity within said apparatus.

6. Apparatus as claimed in claim 4, wherein said dynamic power consumption signal varies in dependence upon a mode of processing operations performed by said apparatus.

7. Apparatus as claimed in claim 1, wherein said energy management signals include an allocation signal indicative of a power level allocated by said energy management circuitry for use by said apparatus.

8. Apparatus as claimed in claim 7, comprising operation control circuitry responsive to said allocation signal to control operation of said processing circuitry such that power consumption of said apparatus does not exceed said power level allocated by said energy management circuitry.

9. Apparatus as claimed in claim 1, wherein at least one of said energy management signals uses a logarithmic encoding of power level.

10. Apparatus as claimed in claim 1, wherein at least one of said energy management signals uses a thermometer encoding of power level.

11. Apparatus as claimed in claim 1, wherein one or more of said static power consumption signal and said dynamic power consumption signal represent an absolute level of power consumption by said apparatus.

12. Apparatus as claimed in claim 1, wherein communication of said energy management signals with said energy management circuitry uses asynchronous request-acknowledge handshaking between said consumer energy interface circuitry and said energy management circuitry.

13. A method of processing data comprising the steps of:
performing processing operations with processing circuitry; and
communicating energy management signals with energy management circuitry;
wherein said energy management signals include:
(i) a static power consumption signal indicative of a level of static power consumption of said apparatus independent of processing operations performed by said processing circuitry, said static power consumption signal being independent of an operating temperature of said apparatus; and
(ii) a dynamic power consumption signal indicative of a level of dynamic power consumption of said apparatus dependent upon processing operations performed by said processing circuitry.

\* \* \* \* \*